US010007321B2

(12) United States Patent
Abu Salah et al.

(10) Patent No.: US 10,007,321 B2
(45) Date of Patent: *Jun. 26, 2018

(54) ENHANCING POWER-PERFORMANCE EFFICIENCY IN A COMPUTER SYSTEM WHEN BURSTS OF ACTIVITY OCCURS WHEN OPERATING IN LOW POWER

(71) Applicant: Intel Corporation, Santa Clara, CA (US)

(72) Inventors: Hisham Abu Salah, Majdal Shams (IL); Eliezer Weissmann, Haifa (IL); Efraim Rotem, Haifa (IL); Paul S. Diefenbaugh, Portland, OR (US); Jay D. Schwartz, Aloha, OR (US); Sharad C. Tripathi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/426,876

(22) Filed: Feb. 7, 2017

(65) Prior Publication Data

US 2017/0147054 A1    May 25, 2017

Related U.S. Application Data

(63) Continuation of application No. 14/313,597, filed on Jun. 24, 2014, now Pat. No. 9,600,058.

(51) Int. Cl.
*G06F 1/32* (2006.01)

(52) U.S. Cl.
CPC .................... *G06F 1/324* (2013.01)

(58) Field of Classification Search
CPC ....... G06F 1/3206; G06F 1/324; G06F 1/3293
USPC ......................... 713/320, 322, 323
See application file for complete search history.

(56) References Cited

U.S. PATENT DOCUMENTS

| | | | | |
|---|---|---|---|---|
| 7,490,254 B2* | 2/2009 | Clark | ............... | G06F 1/3203 713/320 |
| 8,370,663 B2* | 2/2013 | Frid | ............... | G06F 1/3203 713/310 |
| 8,812,825 B2* | 8/2014 | Nijhawan | ............. | G06F 1/3206 712/229 |
| 8,924,756 B2* | 12/2014 | Kaburlasos | ........... | G06F 1/3228 345/418 |
| 9,600,058 B2* | 3/2017 | Abu Salah | ............ | G06F 1/324 |
| 2008/0005592 A1* | 1/2008 | Allarey | ............... | G06F 1/206 713/300 |

(Continued)

*Primary Examiner* — Chun Cao
(74) *Attorney, Agent, or Firm* — Womble Bond Dickinson (US) LLP

(57) ABSTRACT

Techniques described above may enhance the power-performance efficiency of a processor, SoC, or a computing system. Embodiments described here allow an increase in frequency of the clock signal to a peak frequency value in response to detecting an occurrence of a burst of high activity within the low processor utilization periods. A power management unit may accumulate the budget during the low or idle processor utilization periods and the level of activity of the burst of high activity signal may be determined. The PMU may increase the frequency of the clock signal provided to the processing cores if the level of the burst of high activity exceeds a first threshold value and an accumulated budget value exceeds a second threshold value.

21 Claims, 5 Drawing Sheets

(56) References Cited

U.S. PATENT DOCUMENTS

| | | | | |
|---|---|---|---|---|
| 2011/0022868 | A1* | 1/2011 | Harchol-Balter | G06F 1/3203 |
| | | | | 713/323 |
| 2014/0337646 | A1* | 11/2014 | Varma | G06F 1/3206 |
| | | | | 713/322 |
| 2016/0170469 | A1* | 6/2016 | Sehgal | G06F 9/505 |
| | | | | 713/320 |

* cited by examiner

ENHANCING POWER-PERFORMANCE EFFICIENCY IN A COMPUTER SYSTEM WHEN BURSTS OF ACTIVITY OCCURS WHEN OPERATING IN LOW POWER

RELATED APPLICATION

This patent application is a continuation Application of and claims the benefit of U.S. application Ser. No. 14/313,597, entitled "ENHANCING POWER-PERFORMANCE EFFICIENCY IN A COMPUTER SYSTEM WHEN BURSTS OF ACTIVITY OCCURS WHEN OPERATING IN LOW POWER", filed Feb. 7, 2017, which is incorporated by reference in its entirety.

FIELD OF THE INVENTION

This disclosure pertains to enhancing power-performance efficiency in a computer system and in particular but not exclusively, to increase the frequency of the clock signal provided to the processing cores if there is a short burst of activity followed by a long idle period.

BACKGROUND

Today's computing systems support various power saving techniques including moving the processor and the computing system through various hardware P-states and C-states. Many of these techniques include determining processor utilization level over a time window and then select a frequency, which may match the processor utilization level. These techniques cause the frequency of the clock signal supplying the processor cores to be reduced in response to a low processor utilization level.

However, changing the frequency of the clock signal based only on the processor utilization level may, at times, impact the performance of some activities. For example, the frequency of the clock signal may be lowered if the processor utilization is low, however, a high performance activity may occur within that window of low processor utilization. These techniques may still continue to process the high performance activity at the same low frequency level thus impacting performance.

BRIEF DESCRIPTION OF THE DRAWINGS

The embodiments of the invention described herein are illustrated by way of examples and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
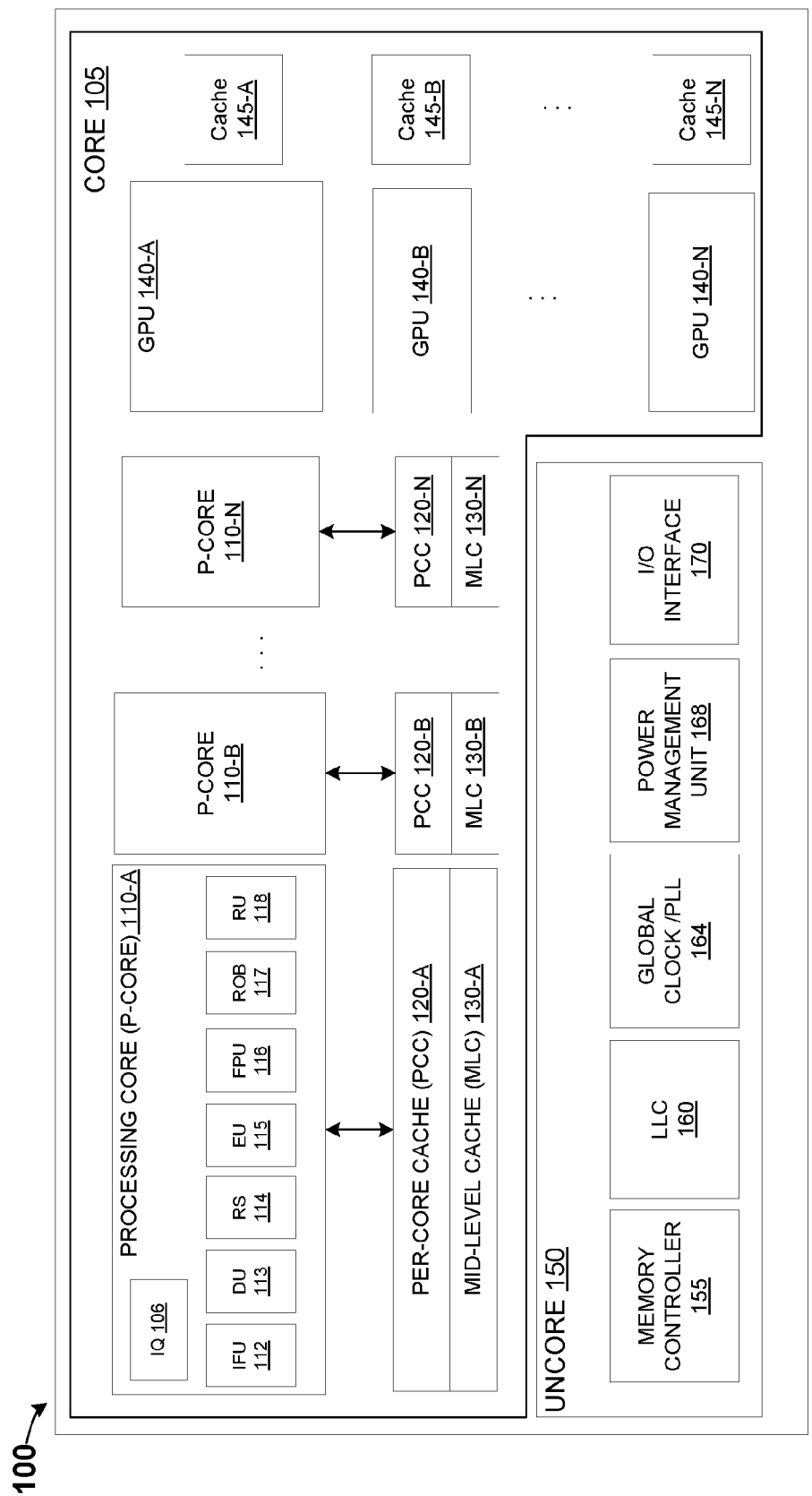
FIG. 1 illustrates a processor 100, which may support enhancement of power-performance efficiency in a computing system in accordance with an embodiment.

The following description describes embodiments, which may enhance power-performance efficiency in a computer system. In the following description, numerous specific details such as logic implementations, resource partitioning, or sharing, or duplication implementations, types and inter-relationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Multi and many core processors, system-on-chips (SoC), and such other components and systems built using such components support various power saving techniques. Most of these power saving techniques include choosing or changing frequency, voltage, or a combination of voltage and frequency (operating points) in response to occurrence of one or more events. For example, the frequency of a clock signal provided to the one or more processing cores may be reduced in response to detecting a low processor utilization level. Embodiments of the technique described here allow such components and systems to increase the frequency of the clock signal to a peak value in response to detecting an occurrence of a burst of high activity within the low processor utilization periods. For example, a burst of I/O operations may translate into a high rate of interrupts within a short duration even within a low processor utilization period. In one embodiment, the power management unit may accumulate the budget during the low or idle processor utilization periods (or low activity periods) and the frequency of the clock signal provided to the processing core(s) may be increased to a peak value if enough budget has been accumulated and/or in response to occurrence of the burst of high activity.

In one embodiment, the power management unit may compare the level of the burst of high activity with a first threshold value (FTV) and if the level of burst of high activity level is higher than the FTV, the accumulated budget may be compared with a second threshold value (STV). In one embodiment, the first threshold value may represent a percentage of the peak processor utilization value. In one embodiment, the second threshold value (STV) may represent a percent of a maximum budget, which can be accumulated over a known period of time such as a present time window and a previous time window or a multiple number of previous time windows ("time window", in general). In one embodiment, the power management unit may increase the frequency to a peak value if the burst of high activity is greater than a percentage of the peak processor utilization value and accumulated budget is greater than the STV. In one embodiment, the power management unit may choose or select or increase the frequency of the clock signal of the processing core(s) to a peak frequency value to perform the burst of high activity. In one embodiment, performing the burst of high activity at a peak frequency value may enhance the performance by enhancing responsiveness, for example. Further, the power management unit may decrease the frequency of the clock signal to a low frequency value after the burst of high activity is performed. As a result, the power-performance efficiency of the component or the system in which the component is included may be enhanced.

An embodiment of a processor 100, which may support enhancements to power-performance efficiencies of the processor is illustrated in FIG. 1. In one embodiment, the processor 100 may comprise a core area 105 and an uncore area 150. In one embodiment, the core 105 and the uncore 150 may support a point-to-point bi-directional bus to communicate between the processing cores (p-cores) 110-A to 110-N, GPUs 140-A and 140-N and between the core area 105 and the uncore area 150.

In one embodiment, the core area 105 may comprise processing cores such as p-cores 110-A to 110-N, per-core caches 120-A to 120-N and mid-level caches 130-A to 130-N associated with the p-cores 110-A to 110-N. In one embodiment, the p-cores 110 may include an instruction queue 106, an instruction fetch unit IFU 112, a decode unit 113, a reservation station RS 114, an execution unit EU 115, a floating point execution unit FPU 116, a re-order buffer ROB 117, and a retirement unit RU 118. In one embodiment, each processor core 110-B to 110-N may each include blocks that are similar to the blocks depicted in the processing core 110-A and the internal details of each of the processing cores 110-B to 110-N is not shown for brevity. The cores 110-A to 110-N may be homogenous or heterogeneous in terms of architecture and/or instruction set. For example, some of the cores 110-A to 110-N may be in order while others are out-of-order. As another example, two or more of the cores 110-A to 110-N may be capable of execution of the same instruction set such as X86 or reduced instruction set architecture (RISC) instructions, while others may be capable of executing only a subset of that instruction set or a different instruction set. Further, the cores 110-A to 110-N may include a combination of big-little cores with different processing and power consumption capabilities. In one embodiment, the per-core caches 120 may include memory technologies that may support higher access speeds, which may decrease the latency of instruction and data fetches, for example. In one embodiment, the core area 105 may include one or more graphics processing units (GPUs) 140-A to 140-N. In one embodiment, the sub-blocks within each of the GPU 240 may be designed to perform video processing tasks, which may include video pre-processing and video post-processing tasks.

In one embodiment, the uncore area 150 may include a memory controller 155, LLC 160, a global clock/PLL 164, a power management unit 168, and an I/O interface 170. In one embodiment, the I/O interface 170 may provide an interface to I/O devices such as the keyboard, mouse, camera, display devices, and such other peripheral devices. In one embodiment, the I/O interface 170 may support, electrical, physical, and protocol interfaces to the peripheral devices. In one embodiment, the I/O interface 170 may include network interfaces and display interfaces to, respectively, provide an interface to a network and a display device.

In one embodiment, the memory controller 155 may interface with the memory devices such as the hard disk and solid state drives. In one embodiment, the global clock/PLL 164 may provide clock signals to different portions or blocks of the computing platform 100. In one embodiment, the portions may be formed based on, for example, the voltage planes and power planes and the clock these blocks or portions may be controlled by the power management unit 168 based on the workload, activity, temperature, or any other such indicators. The power management unit 168 may implement power management techniques such as dynamic voltage and frequency scaling, power gating, turbo mode, throttling, clock gating, and such other techniques.

In one embodiment, the power management unit 168 may accumulate the budget during the low or idle processor utilization periods (or low activity periods) and the frequency of the clock signal provided to the processing core(s) 110 may be increased to a peak value in response to occurrence of the burst of high activity. In one embodiment, the power management unit 168 may compare the level of the burst of high activity with a first threshold (FTV) and if the level of burst of high activity level is higher than the first threshold, the accumulated budget may be compared with a second threshold (STV). In one embodiment, the power management unit 168 may choose or select or increase the frequency of the clock signal of the processing core(s) 110 to a peak frequency value to perform the burst of high activity. In one embodiment, performing the burst of high activity at a peak frequency value may enhance the performance. Further, the power management unit 168 may decrease the frequency of the clock signal to a low frequency value after the burst of high activity is performed. As a result, the power-performance efficiency of the processor 100 may be enhanced.

Figure 2:
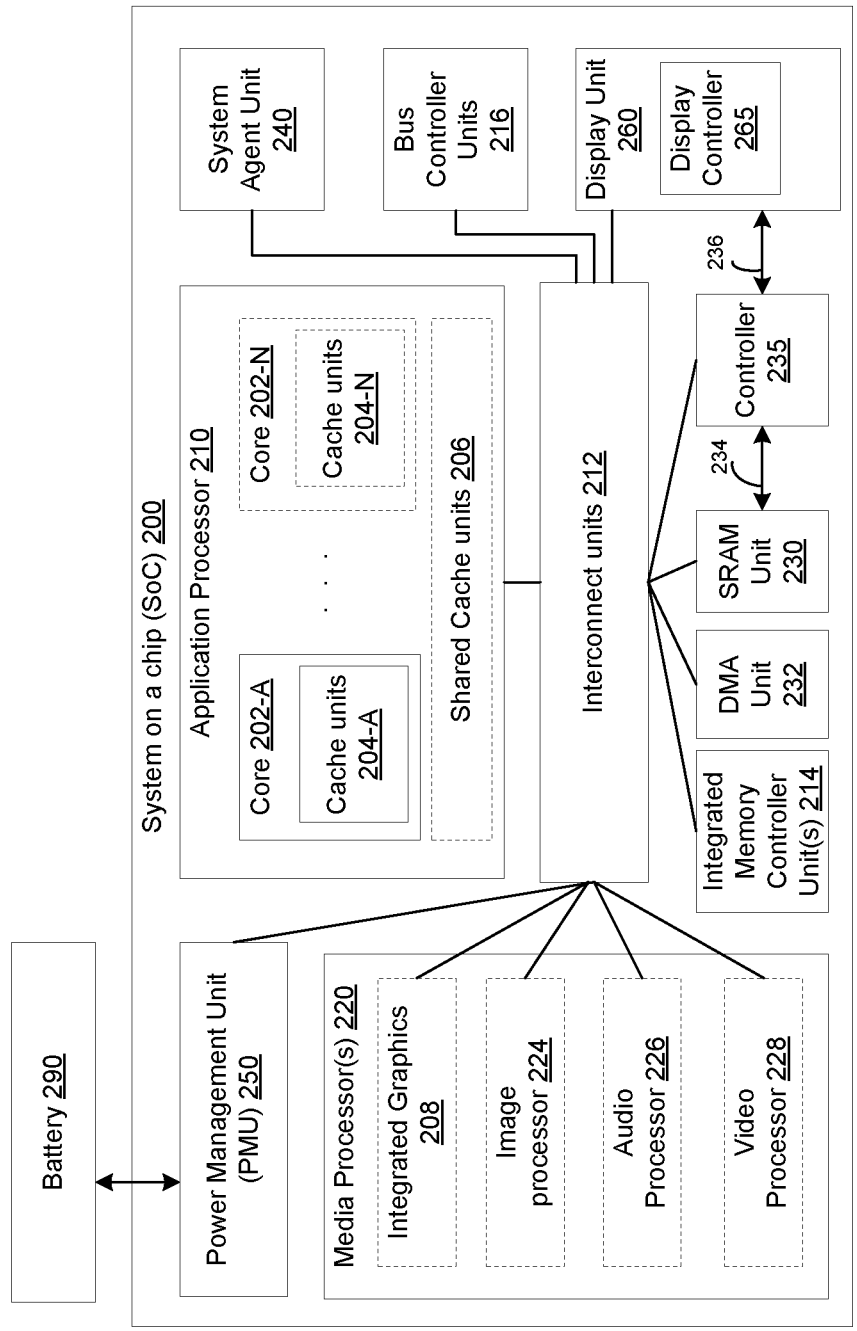
FIG. 2 illustrates a system-on-chip (SoC) 200, which may support enhancement of power-performance efficiency in a computing system in accordance with an embodiment.

An embodiment of a system-on-chip (SoC) 200, which may support one or more techniques to enhance the power-performance efficiency of the SoC 200 is illustrated in FIG. 2. In one embodiment, the SoC 200 may include a single core or a multi-core application processor 210, interconnect unit(s) 212, integrated memory controller unit(s) 214, bus controller unit(s) 216, media processors 220, SRAM units 230, DRAM units 232, controller 235, system agent 240, power management unit 250, and a display unit 260.

The processor 210 and 220 may be a general-purpose processor, such as a Core™ i3, i5, i7, 2 Duo and Quad, Xeon™, Itanium™, XScale™, Atom™ or StrongARM™ processor, which are available from Intel Corporation, of Santa Clara, Calif. Alternatively, the processor may be from another company, such as ARM Holdings, Ltd, MIPS, Advanced Micro Devices etc. The processor may be a special-purpose processor, such as, for example, a network or communication processor, compression engine, graphics processor, co-processor, embedded processor, or the like. The processor may be implemented on one or more chips. The processors 210 and 220 may be a part of and/or may be implemented on one or more substrates using any of a number of process technologies, such as, for example, BiCMOS, CMOS, or NMOS.

The SoC 200 may be used in system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

In FIG. 2, an interconnect unit(s) 212 is coupled to: an application processor 210 which includes a set of one or more cores 202A-N and shared cache unit(s) 206; a system agent unit 240; a bus controller unit(s) 216; an integrated memory controller unit(s) 214; a set or one or more media processors 220, which may include integrated graphics logic 208, an image processor 224 for providing still and/or video camera functionality, an audio processor 226 for providing hardware audio acceleration, and a video processor 228 for providing video encode/decode acceleration; a static random access memory (SRAM) unit 230; a direct memory access (DMA) unit 232; and a display unit 260, which may include one or more display controller(s) 265 for controlling one or more external displays, and a controller 235. In one embodiment, the controller 235 may be a mini or a micro controller and it may be designed to consume substantially low power. In one embodiment, even the battery in its critical (or minimal) charged state may support the power consumption of the controller 235.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect units 212 interconnects the integrated graphics logic 208, the set of shared cache units 206, and the system agent unit 240, alternative embodiments may use any number of well-known techniques for interconnecting such units. In some embodiments, one or more of the cores 202-A to 202-N are capable of multi-threading.

The cores 202-A to 202-N may be homogenous or heterogeneous in terms of architecture and/or instruction set. For example, some of the cores 202-A to 202-N may be in order while others are out-of-order. As another example, two or more of the cores 202-A to 202-N may be capable of execution of the same instruction set, while others may be capable of executing only a subset of that instruction set or a different instruction set. Further, the cores 202-A to 202-N may include a combination of big and little cores with different processing and power consumption capabilities.

In one embodiment, the system agent 240 may include those components for coordinating and operating cores 202-A to 202-N. In one embodiment, the system agent unit 240 may include, for example, a power management unit (PMU) 250 and a display unit 260. The PMU 250 may include logic and components needed for regulating the power state of the cores 202-A to 202-N and the integrated graphics logic 208. The display unit 260 is for driving one or more externally connected displays. In other embodiments, the PMU 250 and display unit 260 may be provided outside the system agent 240 as depicted in FIG. 2. In one embodiment, the PMU 250 may be coupled to a battery 290 and the PMU 250 may keep checking the charge on the battery 290.

In one embodiment, the PMU 250 may increase the frequency of the clock signal to a peak value in response to detecting an occurrence of burst of high activity within the low processor utilization periods. In one embodiment, the PMU 250 may accumulate the budget during the low or idle processor utilization periods (or low activity periods) and the frequency of the clock signal provided to the processing core(s) 202-A to 202-N or the media processor 220 may be increased to a peak value in response to occurrence of the burst of high activity. In one embodiment, the peak value of the frequency may include maximum turbo frequency as well.

In one embodiment, the PMU 250 may compare the level of the burst of high activity with a first threshold value (FTV) and if the level of burst of high activity is higher than the FTV, the accumulated budget may be compared with a STV. In one embodiment, the power management unit may choose or select or increase the frequency of the clock signal of the processing core(s) 202-A to 202-N or a combination thereof to a peak frequency value to perform the burst of high activity. In one embodiment, performing the burst of high activity at a peak frequency value may enhance the performance. Further, the PMU 250 may decrease the frequency of the clock signal to a low frequency value after the burst of high activity is performed. As a result, the power-performance efficiency of the SoC 200 or a system built on SoC 200 may be enhanced.

In one embodiment, the PMU 250 may provide control signals to the controller 235 and the controller 235 may perform appropriate actions based on the control signals. In one embodiment the controller 235 under the control of the PMU 235 may implement techniques such as voltage and frequency throttling, dynamic voltage and frequency scaling (DVFS), instruction throttling, selective and independent power control to multiple cores, change in system sleep states and core sleep states and such other techniques to control power to various portions of the SoC 200.

Figure 3:
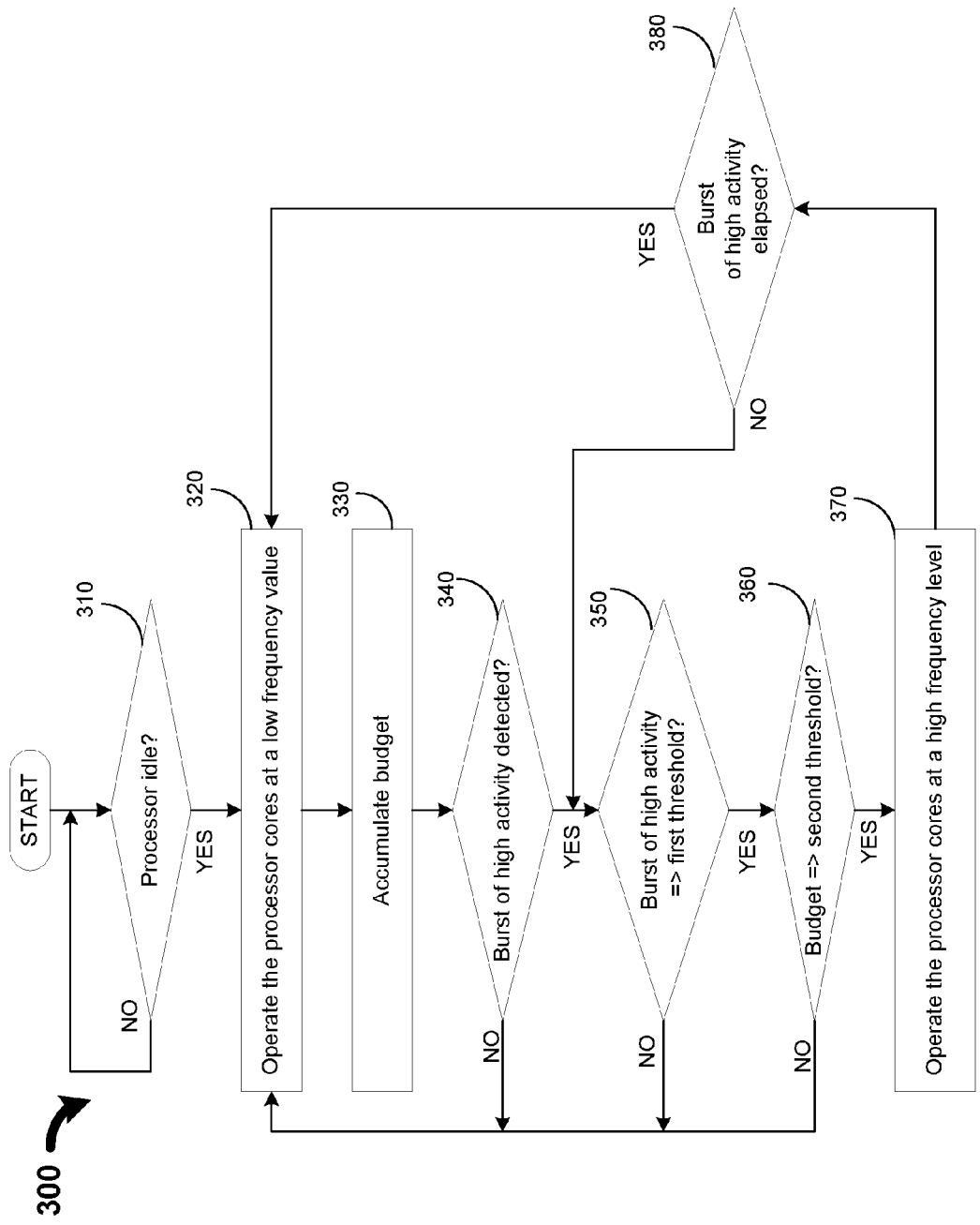
FIG. 3 illustrates a flow-chart describing a technique to enhance performance of a computing system by appropriately selecting the frequency of the signals provided to the processing cores in accordance with one embodiment.

A flow-chart describing the operation of a processor or a SoC to enhance power-performance efficiency is illustrated in FIG. 3. In block 310, the power management unit (PMU) such as PMU 168 or PMU 250, may detect whether the processor is in an idle state and control passes to block 320 if the processor is in idle state. In one embodiment, the PMU may determine whether the processor is idle based on tracking several parameters. For example, the PMU may receive resource usage signals from an operating system and based on such resource usage signals, the PMU may determine if the processor is in an idle state.

In block 320, the PMU may cause the processing cores to operate at a low frequency value. In one embodiment, the PMU 168 (or PMU 250) may control one or more clock signal generators to decrease the frequency of the clock providing the processing cores 110-A to 110-N (or the cores 202-A to 202-N). In one embodiment, the PMU 168 may control the phase locked-loop circuits to control or change the frequency of the clock signal provided to the processing cores.

In block 330, the PMU may accumulate the budget based on the processor idleness in the present and the previous time windows. In one embodiment, the PMU may directly track the budget or in alternate embodiments, there may be other blocks or some specific block associated with the processing cores to accumulate the budget. In one embodiment, the budget may represent the amount of idleness in the past time window(s) (for example, 30 milliseconds). In one embodiment, the budget accumulated will increase if the amount of idleness is high and the budget would decrease if there is some activity on the processor.

In block 340, the PMU may detect occurrence of a burst of high activity based on the processor activity signals received and control passes to block 350 if a burst of high activity is detected and to block 320 otherwise. In one embodiment, blocks such as burst detectors or schedulers may detect the occurrence of the burst of high activity and then send processor activity signals to the PMU. In one embodiment, the processor activity signals may include the level of high activity and duration of high activity and other such parameters based on which the PMU may arrive at decisions, which may help enhancement of power-performance efficiency of the processor or a SoC or a system including such processors and SoCs.

In block 350, the PMU may compare levels of the burst of high activity with the first threshold value and control passes to block 360 if the levels of the burst of high activity is higher than the first threshold value and to block 320 otherwise. In one embodiment, the PMU may determine that the levels of the burst of high activity is greater than the FTV if the levels of the burst of high activity is equal to or above 90% of an allowable maximum or peak levels of an activity. For example, a burst of I/O operations may translate into high rate of interrupts within a short execution window and the interrupt rate may be equal to 1000 interrupts per second and 1000 interrupts per second may be higher than the FTV. However, the FTV may set to other levels as well. In one embodiment, maintaining a higher threshold level may ensure that the lower activity signals do not trigger the PMU to increase the frequency to a peak value.

In block 360, the PMU may compare the budget, accumulated until the occurrence of the burst of high activity, with the second threshold value and control passes to block 370 if the budget is equal to or greater than the second threshold value and to block 320 otherwise. In one embodiment, the second threshold value may be set to 90% of the maximum budget that can be accumulated to ensure that there is sufficient budget to process the burst of high activity at a peak frequency. Frequent changes in frequency for activities that do not merit such changes may negatively impact the power-performance efficiency. In one embodiment, the higher levels of first and second threshold may ensure that the PMU increases the frequency of the clock signal to a peak value only in response to an occurrence of the burst of high activity level, which is above the first and second threshold value.

In block 370, the PMU may increase the frequency of the clock signal provided to the processing cores to a maximum or peak value. In one embodiment, the maximum frequency may represent turbo frequencies as well. In one embodiment, the PMU may control the phase lock-loop (PLL) 164 (of FIG. 1) or the controller 235 (of FIG. 2) to cause an increase in the clock frequency.

In block 380, the PMU may detect whether the burst of high activity is elapsed and control passes to block 320 if the burst of high activity has elapsed and to block 350 otherwise.

Figure 4:
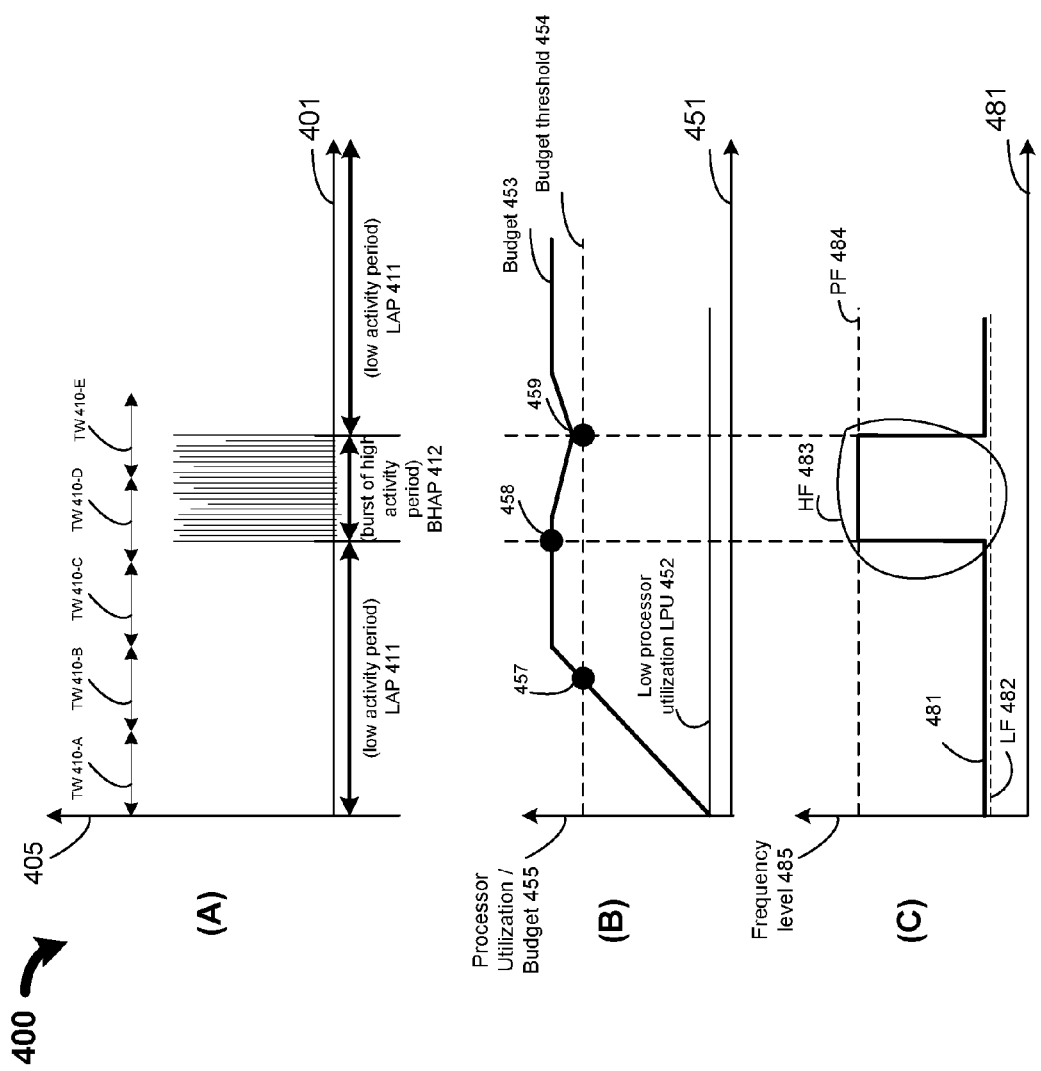
FIG. 4 illustrates a relationship diagram 400 depicting a technique to enhance performance of a computing system by appropriately selecting the frequency of the signals provided to the processing cores in accordance with one embodiment.

An embodiment of a relationship diagram 400 depicting a relationship between various events that enhance the power-performance efficiency in a computing system is illustrated in FIG. 4. FIG. 4(A) illustrates a plot of time 401 (on x-axis) vs. activity level 405. In one embodiment, the time 401 on x-axis may be divided into multiple time windows TW 410-A to 410-E, for example. In one embodiment, the activity levels may be low during a low activity period LAP 411. A burst of high activity may occur during the time period labeled burst of high activity period (BHAP) 412. The BHAP 412 may be followed by LAP 411.

FIG. 4(B) depicts a plot of time 451 vs. processor utilization/budget 455. In one embodiment, as may be readily understood, the processor utilization is low during the period LAP 411 and the level of processor utilization level is depicted as LPU 452. The processor utilization level may continue to remain low even after occurrence of the burst of high activity level during the period BHAP 412. In the absence of the power-performance efficiency technique described above, the frequency of the clock signal may still continue to remain low as depicted by low frequency LF 482 of FIG. 4(c).

However, the embodiments described above increase the frequency of the clock signal to a peak or maximum value (PF 484) in response to occurrence of the burst of high activity in the period BHAP 412. In one embodiment, the budget 453 may increase due to low activity levels during LPU 411 and the accumulated budget may exceed the threshold at a cross-over point 457. In one embodiment, at point 458 and beyond, in response to occurrence of the burst of high activity, the PMU (as described in block 350 of FIG. 3) may check whether the level (or frequency of occurrence of activities) of the burst of high activity is above the first threshold value (FTV). In this example, the level of the burst of high activity (for example, a 1000 I/O interrupts/sec) is above the FTV. In one embodiment, if the level of the burst of high activity is above the FTV, the PMU may check (as described in block 360 of FIG. 3) if the accumulated budget is above the budget or second threshold value 453. As both the level of the burst of high activity and the accumulated budget are, respectively, above the FTV and STV 453, the PMU may quickly increase the frequency (as described in block 370 of FIG. 3) to a peak value PF 484 as depicted by high frequency HF 483. It may be readily appreciated that frequency plot 481 follows LF 482 until the occurrence (at point 458) of the high burst activity and quickly raises to peak frequency value (PF 484), however, in the absence of the techniques describe above LF 482 continues to be at a low frequency level affecting the performance. In one embodiment, the embodiments described above allow the frequency of the clock signal provided to the processing cores to quickly increase (as depicted by the region HF 483) to the peak value 484 and such an approach may enhance the power-performance efficiency of the processor, SoC, or a system in which such processor or SoC is included.

At point 459, the burst of high activity may elapse and the PMU may detect such an event (as described in block 380 of FIG. 3) and in response the frequency of the clock signal provided to processing cores may decrease to a level LF 482 as depicted by the frequency plot 481.

Figure 5:
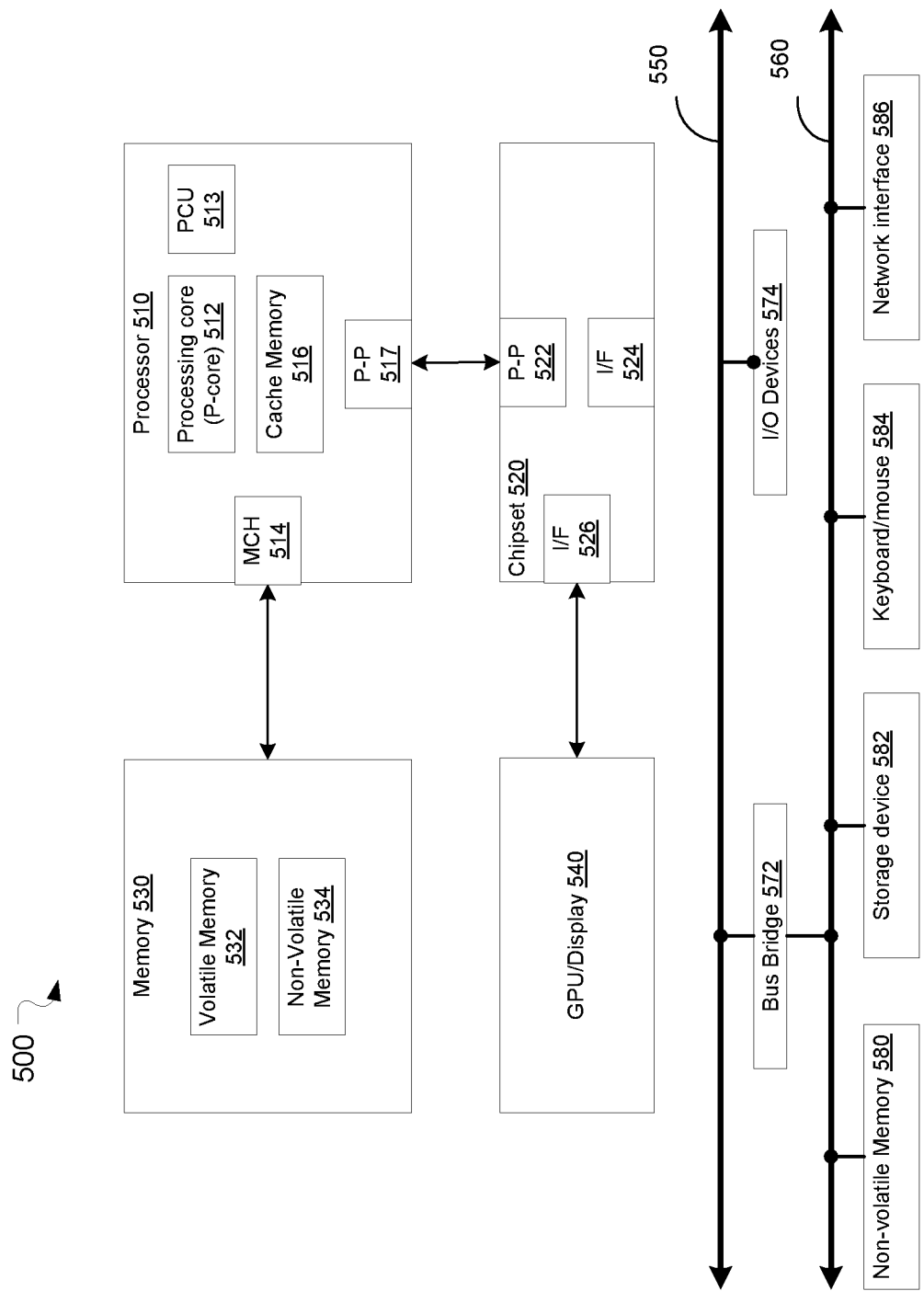
FIG. 5 is a computer system, which may support enhancement of power-performance efficiency in a computing system in accordance with an embodiment.

FIG. 5 illustrates a system or platform 500 to implement the techniques disclosed herein in accordance with an embodiment of the invention. The system 500 includes, but is not limited to, a desktop computer, a tablet computer, a laptop computer, a netbook, a notebook computer, a personal digital assistant (PDA), a server, a workstation, a cellular telephone, a mobile computing device, a smart phone, a wearable device, an Internet appliance or any other type of computing device. In another embodiment, the system 500 used to implement the methods disclosed herein may be a system on a chip (SOC) system.

The processor 510 has a processing core (P-core) 512 to execute instructions of the system 500. The processing core 512 includes, but is not limited to, fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510. In one embodiment of the invention, the processor 510 has a central power management unit PMU 513.

In one embodiment, the PMU 513 the system 600 to increase the frequency of the clock signal to a peak value in response to detecting an occurrence of a burst of high activity within the low processor utilization periods. For example, a burst of I/O operations may translate into a high rate of interrupts within a short duration even within a low processor utilization period. In one embodiment, the power management unit may accumulate the budget during the low or idle processor utilization periods (or low activity periods) and the frequency of the clock signal provided to the processing core(s) may be increased to a peak value in response to occurrence of the burst of high activity.

In one embodiment, the PMU513 may compare the level of the burst of high activity with a first threshold value (FTV) and if the level of burst of high activity level is higher than the FTV, the accumulated budget may be compared with a second threshold value (STV). In one embodiment, the first threshold value may represent a percentage of the peak processor utilization value. In one embodiment, the second threshold value (STV) may represent a percent of a maximum budget, which can be accumulated over a known period of time such as a present time window and a previous time window or a multiple number of previous time windows. In one embodiment, the PMU 513 may increase the frequency to a peak value if the burst of high activity is greater than a percentage of the peak processor utilization value and accumulated budget is greater than the STV. In one embodiment, the PMU 513 may choose or select or increase the frequency of the clock signal of the processing core(s) to a peak frequency value to perform the burst of high activity. In one embodiment, performing the burst of high activity at a peak frequency value may enhance the performance. Further, the PMU 513 may decrease the frequency of the clock signal to a low frequency value after the burst of high activity is performed. As a result, the power-performance efficiency of the system 600 may be enhanced.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also store temporary variables or other intermediate information while the processor 510 is executing instructions. The chipset 520 connects with the processor 510 via Point-to-Point (PtP) interfaces 517 and 522. The chipset 520 enables the processor 510 to connect to other modules in the system 500. In another embodiment of the invention, the chipset 520 is a platform controller hub (PCH). In one embodiment of the invention, the interfaces 517 and 522 operate in accordance with a PtP communication protocol such as the Intel® QuickPath Interconnect (QPI) or the like. The chipset 520 connects to a GPU or a display device 540 that includes, but is not limited to, liquid crystal display (LCD), cathode ray tube (CRT) display, or any other form of visual display device. In another embodiment of the invention, the GPU 540 is not connected to the chipset 520 and is part of the processor 510 (not shown).

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well-known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. The system 500 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc., is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An integrated circuit, comprising:
a plurality of processor cores; and
a power management unit (PMU) coupled to the plurality of processor cores to increase a frequency of a clock signal provided to at least one core of the plurality of processing cores based on an amount of activity occurring within a processor utilization period and a budget tracked during the processor utilization period, wherein the budget represents an amount of idleness of the plurality of processing cores in one or more previous time windows that occur prior to occurrence of the burst of activity.

2. The integrated circuit of claim 1 wherein the power management unit is operable to detect an occurrence of a burst of activity based on one or more processor activity signals.

3. The integrated circuit of claim 1, wherein the budget accumulates if the amount of idleness of the plurality of processing cores is at a first level and the budget decreases in response to occurrence of an activity.

4. The integrated circuit of claim 1, wherein the peak value of frequency includes turbo frequency.

5. The integrated circuit of claim 1 wherein the power management unit is operable to control one or phase locked-loop circuits to increase the frequency of clock signals provided to the plurality of processing cores.

6. An integrated circuit, comprising:
a plurality of processor cores; and
a power management unit (PMU) coupled to the plurality of processor cores to increase a frequency of a clock signal provided to at least one core of the plurality of processing cores based on an amount of activity occurring within a processor utilization period and a budget tracked during the processor utilization period, wherein the PMU is operable to increase the frequency when the budget is equal to a percentage of a maximum budget that can be accumulated to ensure that sufficient budget exists to process a burst of activity at a peak frequency.

7. The integrated circuit of claim 6, wherein the burst high is equal to a high percentage of an allowable maximum levels of an activity.

8. An article of manufacture having one or more non-transitory computer readable media storing instructions which, when executed by a system, cause the system to perform a method comprising:
accumulating a budget while a plurality of processing cores are in a low processor utilization state,
detecting an occurrence of a burst of high activity within the low processor utilization period,
checking whether a level of the burst of high activity is above a first threshold value and the budget is above a second threshold value, and
increasing a frequency of a clock signal provided to the plurality of processing cores to a peak value of frequency if the level of the burst of high activity is above the first threshold value and the budget is above the second threshold value,
wherein the budget represents an amount of idleness of the plurality of processing cores in one or more previous time windows, which occur prior to occurrence of the burst of high activity.

9. The article of manufacture of claim 8, wherein detecting an occurrence of the burst of high activity is based on one or more processor activity signals.

10. The article of manufacture of claim 8, wherein the budget to accumulate if the amount of idleness of the plurality of processing cores is high and the budget to decrease in response to occurrence of an activity.

11. The article of manufacture of claim 8, wherein the second threshold value is equal to a high percentage of a maximum budget that can be accumulated to ensure that there is sufficient budget to process the burst of high activity at a peak frequency.

12. The article of manufacture of claim 8, wherein the first threshold value is equal to a substantially high percentage of an allowable maximum levels of an activity.

13. The article of manufacture of claim 8, wherein the peak value of frequency includes turbo frequency.

14. The article of manufacture of claim 8 further comprises controlling one or more phase locked-loop circuits to increase the frequency of clock signals provided to the plurality of processing cores.

15. A computing system, comprising:
a memory,
a chipset,
a plurality of input-output devices,
a network interface,
a processor, the processor further comprises a plurality of processing cores, a plurality of graphics cores, and a power management unit (PMU), wherein the processor to increase a frequency of a clock signal provided to at least one core of the plurality of processing cores based on an amount of activity occurring within a processor utilization period and a budget tracked during the processor utilization period, wherein the budget represents an amount of idleness of the plurality of processing cores in one or more previous time window that occur prior to occurrence of the burst of activity.

16. The computing system of claim 15 wherein the power management unit is operable to detect an occurrence of a burst of activity based on one or more processor activity signals.

17. The computing system of claim 15, wherein the budget accumulates if the amount of idleness of the plurality of processing cores is at a first level and the budget decreases in response to occurrence of an activity.

18. A computing system, comprising:
a memory,
a chipset,
a plurality of input-output devices,
a network interface,
a processor, the processor further comprises a plurality of processing cores, a plurality of graphics cores, and a power management unit (PMU), wherein the processor to increase a frequency of a clock signal provided to at least one core of the plurality of processing cores based on an amount of activity occurring within a processor utilization period and a budget tracked during the processor utilization period, wherein the PMU is operable to increase the frequency when the budget is equal to a percentage of a maximum budget that can be accumulated to ensure that sufficient budget exists to process the burst of activity at a peak frequency.

19. The computing system of claim 15, wherein the burst high is equal to a high percentage of an allowable maximum levels of an activity.

20. The computing system of claim 15, wherein the peak value of frequency includes turbo frequency.

21. The computing system of claim 15 wherein the processor is operable to control one or phase locked-loop circuits to increase the frequency of clock signals provided to the plurality of processing cores.

* * * * *